United States Patent
Heaven, Jr.

(10) Patent No.: US 7,487,936 B2
(45) Date of Patent: Feb. 10, 2009

(54) BUOYANCY CONTROL SYSTEM FOR AN AIRSHIP

(75) Inventor: George H. Heaven, Jr., Las Vegas, NV (US)

(73) Assignee: LTAS Holdings, LLC, Las Vegas, NV (US)

(*) Notice: Subject to any disclaimer, the term of this patent is extended or adjusted under 35 U.S.C. 154(b) by 75 days.

(21) Appl. No.: 11/608,753

(22) Filed: Dec. 8, 2006

(65) Prior Publication Data

US 2008/0135678 A1 Jun. 12, 2008

Related U.S. Application Data

(60) Provisional application No. 60/862,547, filed on Oct. 23, 2006.

(51) Int. Cl.
*B64B 1/58* (2006.01)
*B64B 1/02* (2006.01)

(52) U.S. Cl. .................... 244/30; 244/97; 244/128

(58) Field of Classification Search ............... 244/5, 244/24, 30, 31, 96, 97, 99, 128
See application file for complete search history.

(56) References Cited

U.S. PATENT DOCUMENTS

| | | | |
|---|---|---|---|
| 998,538 A | 7/1911 | Lehman | |
| 1,577,756 A | 3/1926 | Reagan | |
| 1,795,335 A | 3/1931 | Hall | |
| 1,972,242 A | 9/1934 | Morse | |
| 2,094,619 A | 10/1937 | Reichert | |
| 3,083,934 A | 4/1963 | Vanderlip | |
| 3,176,935 A * | 4/1965 | White et al. | 244/31 |
| 3,420,473 A | 1/1969 | Krafft | |
| 4,014,483 A | 3/1977 | MacNeill | |
| 4,269,375 A * | 5/1981 | Hickey | 244/26 |
| 4,326,681 A | 4/1982 | Eshoo | |
| 4,685,640 A * | 8/1987 | Warrington et al. | 244/29 |
| D307,131 S * | 4/1990 | Kramer | D12/325 |
| D307,884 S * | 5/1990 | Ninkovich | D12/325 |
| D309,887 S | 8/1990 | Ninkovich | |
| 4,967,983 A | 11/1990 | Motts | |
| 5,071,383 A | 12/1991 | Kinoshita | |
| 5,358,200 A | 10/1994 | Onda | |
| 5,538,203 A | 7/1996 | Mellady | |
| 5,645,248 A | 7/1997 | Campbell | |
| 5,697,579 A | 12/1997 | Hayashi | |
| 5,713,536 A | 2/1998 | Bata | |

(Continued)

FOREIGN PATENT DOCUMENTS

RU 2005650 C1 * 1/1994

(Continued)

*Primary Examiner*—Michael R Mansen
*Assistant Examiner*—Joseph W Sanderson
(74) *Attorney, Agent, or Firm*—Snell & Wilmer L.L.P.

(57) ABSTRACT

One embodiment of the invention provides an airship having an outer tube formed in the shape of a toroid and defining a central opening, a first compartment positioned within the outer tube and containing a first gas, and a second compartment positioned within the outer tube and containing a second gas. The airship may also include top and bottom covers further defining and enclosing the central opening, the central opening containing the second gas, and a controller that controls the flow of the first gas into and out of the first compartment to actively control the ascent and descent of the airship.

28 Claims, 15 Drawing Sheets

U.S. PATENT DOCUMENTS

| | | | |
|---|---|---|---|
| 5,755,402 | A | 5/1998 | Henry |
| 5,810,286 | A | 9/1998 | Matsler |
| 5,890,676 | A | 4/1999 | Coleman et al. |
| 5,931,413 | A | 8/1999 | Hayashi |
| 5,992,795 | A * | 11/1999 | Tockert ............ 244/31 |
| 6,010,093 | A | 1/2000 | Paulson |
| 6,019,317 | A | 2/2000 | Simmons et al. |
| 6,116,538 | A | 9/2000 | Häfelfinger |
| 6,119,979 | A | 9/2000 | Lee et al. |
| 6,119,983 | A | 9/2000 | Provitola |
| 6,182,924 | B1 | 2/2001 | Nott |
| 6,189,829 | B1 | 2/2001 | Brotz |
| 6,196,498 | B1 | 3/2001 | Eichstedt et al. |
| 6,286,783 | B1 | 9/2001 | Kuenkler |
| 6,293,493 | B1 | 9/2001 | Eichstedt et al. |
| 6,302,357 | B1 | 10/2001 | Kalisz |
| 6,305,641 | B1 | 10/2001 | Onda |
| 6,311,925 | B1 | 11/2001 | Rist |
| 6,315,242 | B1 | 11/2001 | Eichstedt et al. |
| 6,354,535 | B1 | 3/2002 | Perry et al. |
| 6,357,700 | B1 | 3/2002 | Provitola |
| 6,371,409 | B1 | 4/2002 | Steele |
| 6,382,557 | B1 | 5/2002 | Lafuma et al. |
| 6,386,480 | B1 | 5/2002 | Perry et al. |
| 6,425,552 | B1 | 7/2002 | Lee et al. |
| 6,427,943 | B2 | 8/2002 | Yokomaku et al. |
| 6,439,148 | B1 | 8/2002 | Lang |
| 6,467,724 | B2 | 10/2002 | Kuenkler |
| 6,471,159 | B1 | 10/2002 | Bundo |
| 6,527,223 | B1 | 3/2003 | Mondale |
| 6,540,178 | B1 | 4/2003 | Hillsdon |
| 6,568,631 | B1 | 5/2003 | Hillsdon |
| 6,609,680 | B2 | 8/2003 | Perry et al. |
| 6,648,272 | B1 | 11/2003 | Kothmann |
| 6,685,136 | B2 * | 2/2004 | Yajima et al. ............ 244/31 |
| 6,698,686 | B2 | 3/2004 | Ogawa et al. |
| 6,739,549 | B2 * | 5/2004 | Senepart ............ 244/24 |
| 6,811,115 | B2 | 11/2004 | Kurose |
| 6,837,458 | B2 | 1/2005 | Swearingen et al. |
| 6,966,523 | B2 * | 11/2005 | Colting ............ 244/30 |
| 7,055,777 | B2 * | 6/2006 | Colting ............ 244/30 |
| 7,156,342 | B2 * | 1/2007 | Heaven et al. ............ 244/30 |
| 2006/0065777 | A1 | 3/2006 | Walden et al. |
| 2007/0295859 | A1 * | 12/2007 | Colvin ............ 244/24 |

FOREIGN PATENT DOCUMENTS

RU     2155143 C1 *  8/2000
WO   WO 9532894 A1 *  12/1995

* cited by examiner

BUOYANCY CONTROL SYSTEM FOR AN AIRSHIP

CLAIM OF PRIORITY UNDER 35 U.S.C. §119

The present Application for Patent claims priority to Provisional Application No. 60/862,547, filed on Oct. 23, 2006, and assigned to the assignee hereof and hereby expressly incorporated by reference herein.

FIELD OF THE INVENTION

The invention relates generally to systems for providing active vertical control of an airship. More particularly, the invention relates to systems for actively controlling the static weight of an airship by altering the ratio of air to lifting gas contained within the airship.

DESCRIPTION OF THE RELATED ART

A conventional lighter-than-air or buoyant aircraft (commonly referred to as a "blimp" or "airship") employs a lighter-than-air lifting gas, typically helium, to provide buoyancy or "lift." Temperature and pressure changes resulting from altitude changes and variable atmospheric conditions generally cause the helium contained within the hull of the airship to expand or contract, resulting in a constantly varying volume of helium. To maintain a constant internal pressure within the hull (and thereby avoid collapsing or bursting the hull), a conventional airship employs one or more fabric ballonets. The fabric ballonets are a passive system that reacts to, and compensates for, changes in helium volume by either filling with outside air or exhausting air to the atmosphere, thereby maintaining hull pressure within acceptable limits. A conventional airship is pressurized only to the minimum extent necessary to maintain its hull shape under flight and mooring loads and its ballonets are not capable of actively controlling the static weight of the airship to any appreciable extent.

Positive buoyancy (sometimes described as the airship being "statically light") is obtained when the amount of buoyancy or "lift" generated by the lifting gas is greater than the mass (weight) of the airship and its payload, thereby enabling the airship to ascend without the need for any other form of assistance, such as dynamic lift and/or vectored engine thrust. Negative buoyancy (sometimes described as the airship being "statically heavy") is obtained when the amount of buoyancy or "lift" generated by the lifting gas is less than the mass (weight) of the airship and its payload, thereby causing the airship to descend and preventing it from ascending or remaining aloft without employing some other form of assistance, such as dynamic lift and/or vectored engine thrust. In a conventional airship, the pilot and crew have no way of altering the buoyancy of the airship other than releasing helium into the atmosphere or releasing disposable ballast (such as sand or water). These techniques are imprecise and, more importantly, cannot be easily reversed. For example, once helium is released into the atmosphere it cannot be reacquired during flight; therefore, the airship becomes and remains statically heavier for the duration of its flight. Similarly, a sand or water ballast disposed of during flight cannot be reacquired during flight; therefore, the airship becomes and remains statically lighter for the duration of its flight. In other words, none of these ballasting techniques are suitable for actively controlling an airship's static weight, both heavier and lighter, during flight.

To compensate for the loss of weight during a flight as fuel is consumed, a conventional airship usually begins its flight statically heavy. To overcome this heaviness and become airborne, the airship either has to generate dynamic lift by performing a takeoff run similar to that of an airplane (but generally of shorter length), or, if so equipped, by using vectored engine thrust to ascend to an altitude where the additional weight can again be carried by forward movement and dynamic lift. Even if an airship takes off statically heavy, it normally arrives at its destination statically light after fuel is consumed during the flight, making the landing maneuver very difficult. In a conventional airship, this statically light condition can be overcome only by employing negative lift to force the airship down via forward airspeed, or by employing vectored engine thrust to force the airship downward. The negative lift method requires a minimum length of runway or similar cleared surface for useful operation, while the vectored engine thrust method consumes a great deal of fuel and requires expensive vectored engines. Both methods require a substantial ground crew to handle the airship on its final approach and/or moor the airship.

Another drawback of conventional airships is the difficulty experienced in offloading passengers and cargo. That is, as passengers and cargo are offloaded, the airship becomes increasingly buoyant. Therefore, ballast (such as sand or water) must be loaded onto the airship to compensate for the increased buoyancy and subsequently offloaded to allow the airship to become airborne again. Alternatively, the airship may be firmly affixed to the ground via cables or other fastening devices, or through a constantly compensating downward force generated by vectored engine thrust. Both procedures are cumbersome and time-consuming.

SUMMARY OF THE INVENTION

Figure 1:
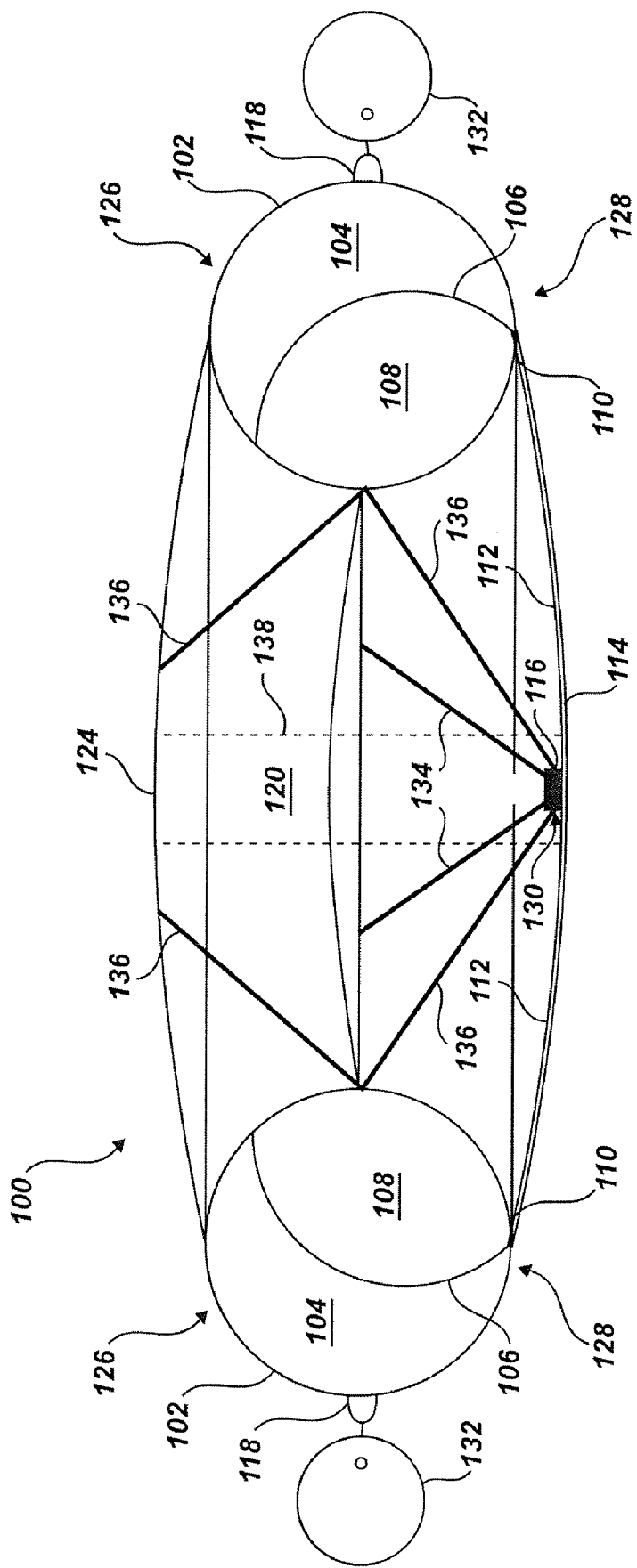
FIG. 1 illustrates a front cross-sectional view of an airship having top and bottom covers that employs a buoyancy control system for controlling the ascent and descent of the airship according to one embodiment of the invention.

One embodiment of the invention provides an airship comprising an outer tube formed in the shape of a toroid and defining a central opening, a first compartment positioned within the outer tube and containing a first gas, and a second compartment positioned within the outer tube and containing a second gas. The airship also may include top and bottom covers further defining and enclosing the central opening, the central opening containing the second gas, and a controller that controls the flow of the first gas into and out of the first compartment to actively control the static weight (and hence the ascent and descent) of the airship.

One embodiment of the invention provides an airship comprising an outer tube formed in the shape of a toroid and containing a first gas, a first compartment positioned within the outer tube and containing a second gas, an inner tube formed in the shape of a toroid and containing the first gas, the inner tube being positioned adjacent to the outer tube, a second compartment positioned within the inner tube and containing the second gas, top and bottom covers enclosing the inner tube and a controller that controls the flow of the second gas into and out of the first and second compartments to actively control the ascent and descent of the airship.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. For instance, the term "buoyancy control system" or "BCS" as described herein may include, but is not necessarily limited to, a system for adjusting the aerostatic lift of an airship by altering the ratio of air to lifting gas contained within the airship, and thus the overall mass of the airship. For example, the BCS can alter the weight of an airship by, for example about 0 pounds to about ±1,000,000 pounds, depending on the size of the airship and/or pressure used within the toroid or sphere. The term "airship" as described herein may include, but is not necessarily limited to, an aircraft, an airship, a blimp, a hybrid aircraft and/or any other vehicle that employs a lifting gas. In one embodiment, the airship may be a lenticular shaped airship without any internal structural support members to maintain the lenticular shape. In one embodiment, the airship may include, but is not necessarily limited to, an outer tube formed in the shape of a toroid and one or more compartments positioned within the outer tube. The term "tube" as described herein may include, but is not necessarily limited to, a structure capable of containing a gas and capable of withstanding a specific internal pressure and/or external pressure. The tube may be formed in the shape of, for example, a cylinder, a toroid, or any other shape capable of containing a gas. The tube may be capable of withstanding an internal pressure of between about 1 inch and about 7 inches of water at an altitude of about 65,000 feet and higher relative to sea level. The term "central area" or "central opening" as described herein may include, but is not necessarily limited to, an enclosed space capable of containing a gas and defined on its circumference by the outer tube. The term "compartment" as described herein may include, but is not necessarily limited to, a chamber, a bag, a balloon, a cell, a tube or any other flexible, gas-impermeable enclosure. The tube and/or compartment may be constructed from a wide variety of materials including, but not necessarily limited to, light metals, composites and/or fabrics formed in a variety of sizes and shapes.

FIG. 1 illustrates a front cross-sectional view of an airship 100 that employs a buoyancy control system ("BCS") according to one embodiment of the invention. The BCS employs one or more mechanisms to actively control the static weight (and hence the ascent or descent) of the airship 100. Additionally, the BCS is used to compensate for various external factors that might affect the static weight of the airship 100, such as a change in ambient atmospheric conditions, the consumption of fuel, a change in the level of superheat of the helium gas, or the offloading of passengers and cargo. The BCS advantageously overcomes many of the drawbacks and inefficiencies of conventional vertical control mechanisms such as ballasting, gas release, dynamic lift and vectored engine thrust. The BCS does not require the carrying of excess weight, or the release of lifting gas, to compensate for expected weight changes of the airship 100 during flight, or the use of dynamic lift or vectored engine thrust. The various BCSs may compensate for changes in operating conditions (e.g., pressure and temperature changes, fuel consumption, the loading and offloading of payload, etc.). For example, a pilot may operate the BCS to compensate for a change in the static weight of the airship 100 caused by superheat, whether on the ground or in flight. In one embodiment, the superheat may be absorbed as pressure, which will not affect the static weight or the altitude of the airship 100.

The airship 100 may include an outer tube 102 made of a gas-impermeable, flexible, inelastic (e.g., fabric) material and/or a gas-impermeable, semi-rigid, inelastic (e.g., lightweight metal or composite) material, or any combination thereof, that provides structural integrity to the airship 100, alone or in conjunction with, an internal structural framework. Sufficiently pressurized, the outer tube 102 provides rigidity to the airship 100 without requiring a separate rigid internal framework. In one embodiment, the outer tube 102 may be made of a Vectran® or Mylar®-based fabric material.

In one embodiment, the outer tube 102 may be made of a composite material such as a combination of Vectran® and Mylar® where a Vectran® sheet is placed between two Mylar® sheets. In one embodiment, the outer tube 102 may be made of a rigid composite material such as a carbon fiber material, a Kevlar material or an M5 material or a flexible membrane material. The outer tube 102 may be configured in the shape of a cylinder, a toroid, and various other aerodynamic shapes.

The outer tube 102 may be designed to contain one or more gases 104 (e.g., helium, hydrogen, air, other gases, and/or combinations thereof) and/or to enclose one or more compartments 106 that may contain one or more gases 108. The gases 108 may provide all or most of the lift so that little or no additional energy is expended to make the airship 100 airborne. The gases 108 may be pressurized to create the buoyancy control. In one embodiment, the gas 104 within the outer tube 102 may be pressurized to a pressure greater than the atmospheric pressure. For example, the gas 104 may be pressurized to greater than 2 psi. One advantage of the design is manufacturing simplicity. For example, a toroidal or lenticular geometry makes the design and manufacture of the BCS relatively simpler than conventional designs. Another advantage of the design is that the toroid or lenticular shape can better withstand the internal pressures associated with the BCS.

Figure 5:
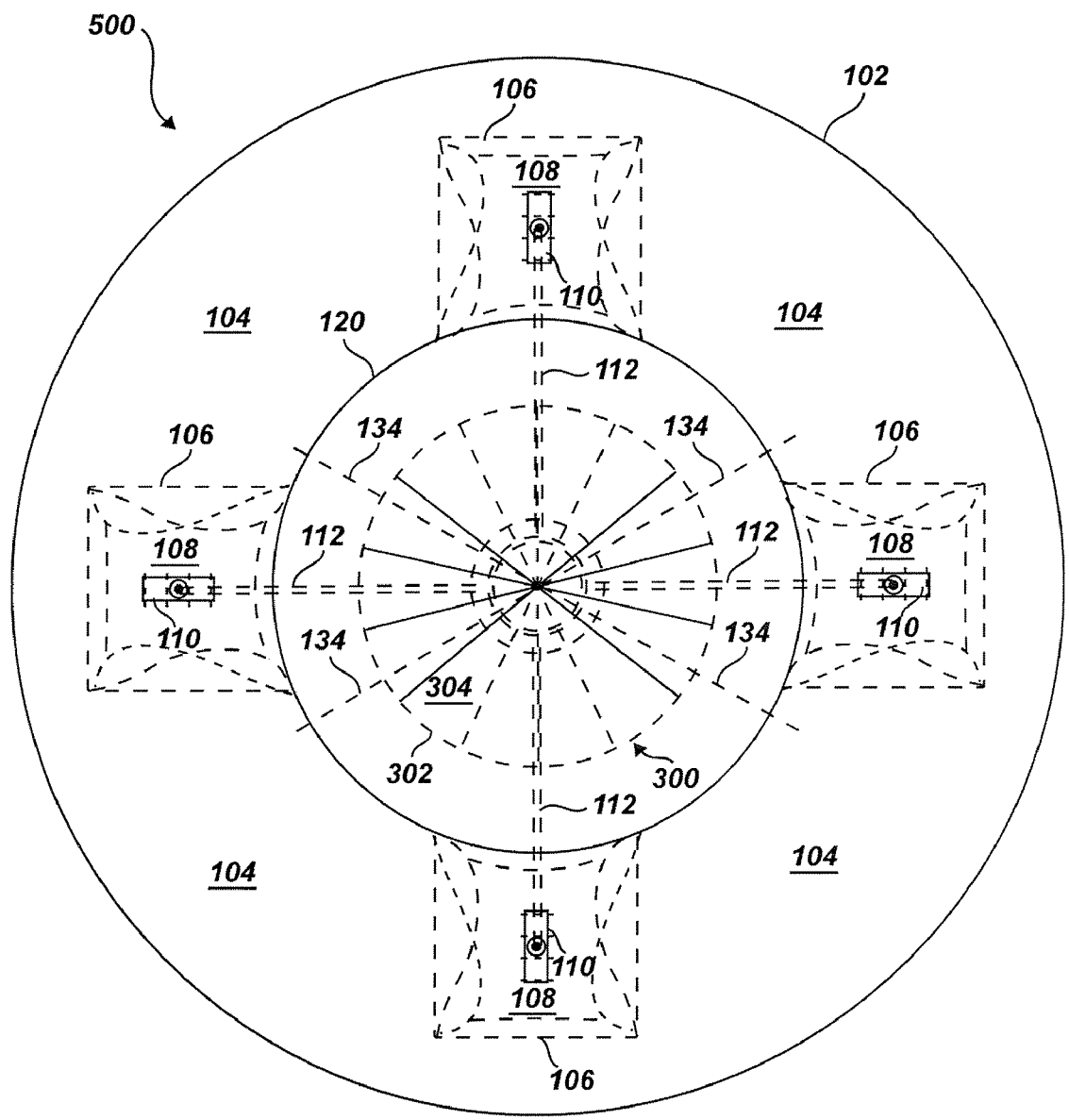
FIG. 5 illustrates a cross-sectional top view of an airship according to one embodiment of the invention.

The airship 100 may include one or more compartments 106 positioned within the outer tube 102. The area outside the compartments 106 but within the outer tube 102 contains a lifting gas 104. Hence, the outer tube 102 may be made of a gas-impermeable material. Each compartment 106 may be made of a gas-impermeable, flexible, inelastic (e.g., fabric) material and may contain one or more gases 108. In one embodiment, the one or more compartments 106 may be made of a polyurethane material. The one or more compartments 106 may be fastened to the outer tube 102 using an adhesive such as glue, one or more tie-downs or attachment points, or a combination thereof. The size and shape of each compartment 106 can vary depending on the size, shape and weight of the airship 100 and the materials available. In FIG. 5, four (4) compartments 106a-106d are spaced an equidistance apart from one another around an inner circumference of the outer tube 102 and contain a gas 108 such as air. The area around the four (4) compartments 106a-106d contains a lifting gas 104.

In some embodiments, the airship 100 may include a compartment 106 that extend around a portion of the outer tube 102 or the entire outer tube 102 and that is capable of holding air 108. The area exterior to and around the compartment 106 but within the outer tube 102 contains air 104. When filled with air 108, the compartment 106 may extend to partially fill the outer tube 102.

If the operator desires the airship 100 to descend or remain grounded, one or more compartments 106 are filled with air 108 to increase the static weight of the airship 100. Conversely, if the operator desires the airship 100 to ascend, air 108 is released from the one or more compartments 106. The airship 100 may include pumps and/or valves 110 that may be attached to the one or more compartments 106 and that actively control the flow of air 108 into and out of the one or more compartments 106. In one embodiment, a single bidirectional pump and/or valve 110 may be used to control or regulate the flow of the air 108 into and out of the one or more compartments 106. One or more conduits or lines 112 may be coupled on one end to the pumps and/or valves 110 and are coupled on the other end to a bottom cover 114. The lines 112 allow the flow air 108 to travel between the one or more compartments 106 and the outside atmosphere. In one embodiment, the airship 100 may include a control device 116 (e.g., a processor or a controller) that actively controls the functions and operations of the pumps and valves 110. The control device 116 may be programmed before the flight of the airship 100 or a pilot on the ground or in the airship 100 may use the control device 116 to actively control the flight and operations of the airship 100. The control device 116 may be located on the airship 100 or may be located on the ground allowing for remote control of the airship 100. The remote control of the airship 100 allows the airship 100 to be an unmanned airship for military and surveillance purposes.

In one embodiment, the lifting gas 104 may be contained in the outer tube 102 and the air 108 may be contained in the one or more compartments 106. When the airship 100 is on the ground, the one or more compartments 106 may be filled or partially filled with air 108. As the amount of air 108 in the one or more compartments 106 increases, the internal pressure within the outer tube 102 also increases. As the amount of air 108 in the one or more compartments 106 decreases, the internal pressure within the outer tube 102 also decreases. However, the outer tube 102 maintains an internal pressure greater than atmospheric pressure even when there is no air 108 in any of the compartments 106, such that the outer tube 102 maintains its rigidity and continues to provide adequate structural support for engine pylons 118 and the airship 100 as a whole. The engine pylons 118 can be attached to an outer surface of the outer tube 102.

Figure 2:
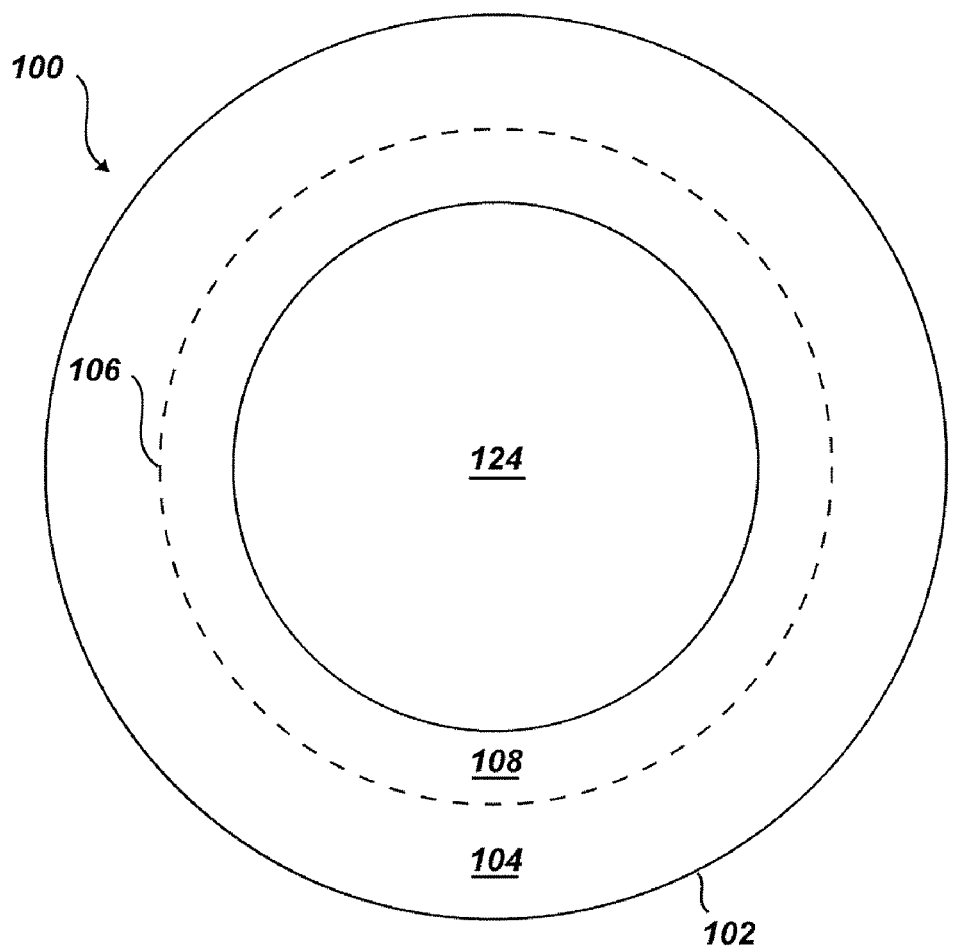
FIG. 2 illustrates a top view of the airship of FIG. 1 that employs a buoyancy control system for controlling the ascent and descent of the airship according to one embodiment of the invention.

FIG. 2 illustrates a top view of the airship 100 of FIG. 1 that employs a BCS for controlling the ascent and descent of the airship 100 according to one embodiment of the invention. Referring to FIGS. 1 and 2, the airship 100 may also include a bottom cover 114 and a top cover 124. The inner surfaces of the outer tube 102, the bottom cover 114 and the top cover 124 defines a central opening 120. The bottom cover 114 and the top cover 124 may each be a circular piece of composite or fabric (e.g., Vectran® and/or Mylar®) material that attaches to the outer tube 102 and encloses the central opening 120. In one embodiment, the bottom cover 114 and the top cover 124 are made of a gas-impermeable, flexible, inelastic material. In one embodiment, the bottom cover 114 and the top cover 124 may be made of a rigid composite material such as a carbon fiber material, a Kevlar material or an M5 material or a flexible membrane material. The material of the bottom cover 114 and the top cover 124 may be the same or similar to the material of the outer tube 102. The top cover 124 is circumferentially coupled (e.g., using an adhesive such as glue) to a top portion 126 of the outer tube 102 and the bottom cover 114 is circumferentially coupled (e.g., using an adhesive such as glue) to a bottom portion 128 of the outer tube 102. With the bottom and top covers 114 and 124, the airship 100 has a lenticular shape.

The central opening 120 may be used to hold helium under an internal pressure. A blower 130, preferably located within the central opening 120, may be used to maintain an internal pressure within the central opening 120 sufficient to give a convex shape to the bottom cover 114 and the top cover 124. In one embodiment, the internal pressure within the outer tube 102 is greater than the internal pressure within the central opening 120. This is because the bottom cover 114 and the top cover 124 can deform the outer tube 102 with less pressure.

Propellers 132 may be coupled to the engine pylon 118 which is coupled to the outer tube 102 for providing yaw control to the airship 100. In one embodiment, the airship 100 may include a cabin (not shown) positioned inside or outside the central opening 120 to house an operator, passengers, cargo, equipment, a control room, etc. If the cabin includes an operator or passengers, the cabin may need to be pressurized accordingly. If the airship is unmanned, the cabin may serve as a payload bay for control systems, sensors and/or cargo. A plurality of cables 134 may be attached to the outer tube 102 and the bottom cover 114 to support the cabin and/or the payload bay.

Referring to FIG. 1, the airship 100 may have anchor or catenary cables 136 and 138 that are used to secure the bottom and top covers 114 and 124. A number of catenary cables 136 and 138 may be used to unload or divert the internal pressure from the top and bottom covers 114 and 124 to the outer tube 102. A first set of diagonally positioned catenary cables 136 (e.g., 3 or 6 equispaced catenary cables) may be attached between the top cover 124 and the outer tube 102. A second set of diagonally positioned catenary cables 136 (e.g., 3 or 6 equispaced catenary cables) may be attached between the bottom cover 114 and the outer tube 102. A set of vertically positioned catenary cables 138 may be attached between the top and bottom covers 124 and 114.

Figure 3:
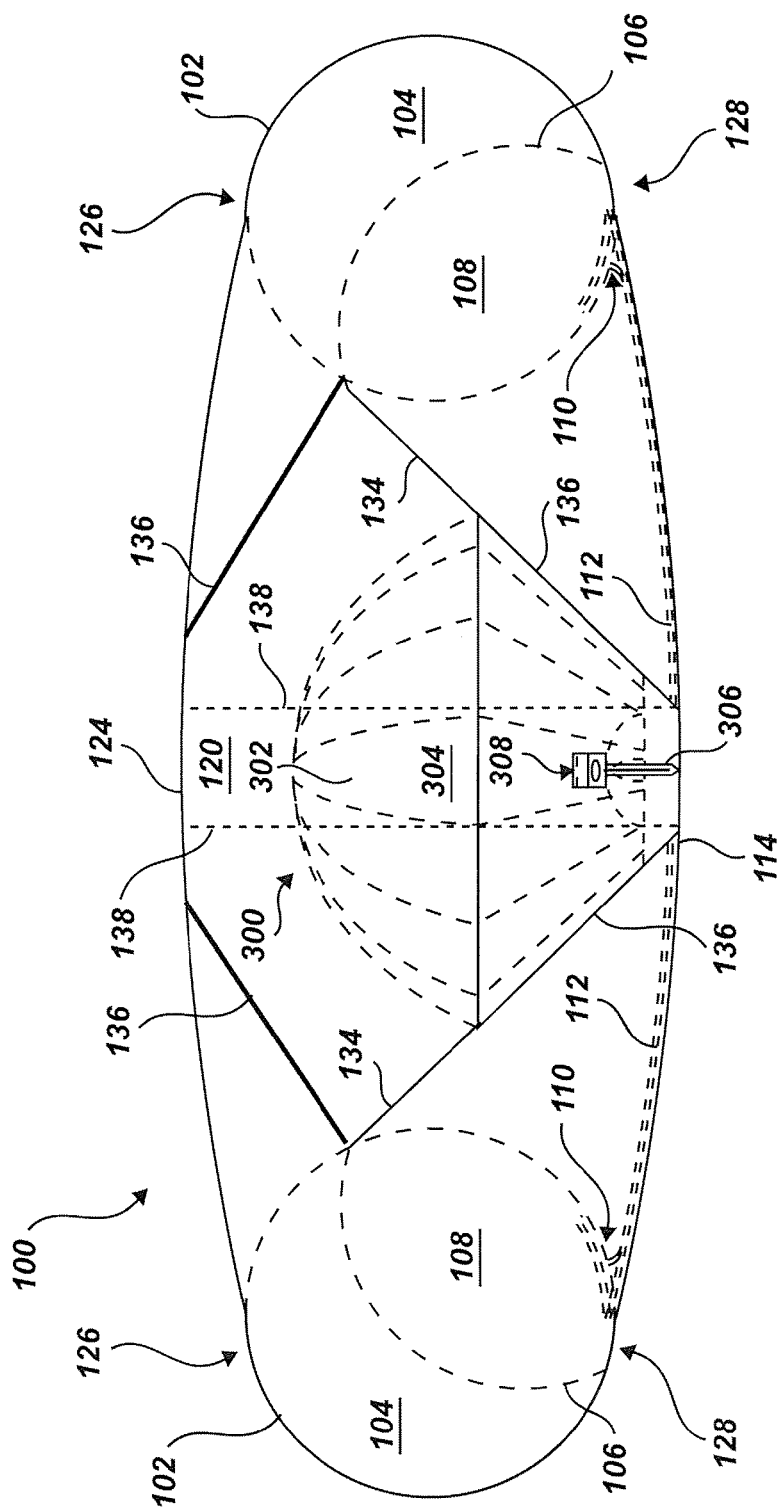
FIG. 3 illustrates a front schematic view of the airship of FIG. 1 having top and bottom covers that employs a buoyancy control system for controlling the ascent and descent of the airship according to one embodiment of the invention.
Figure 4:
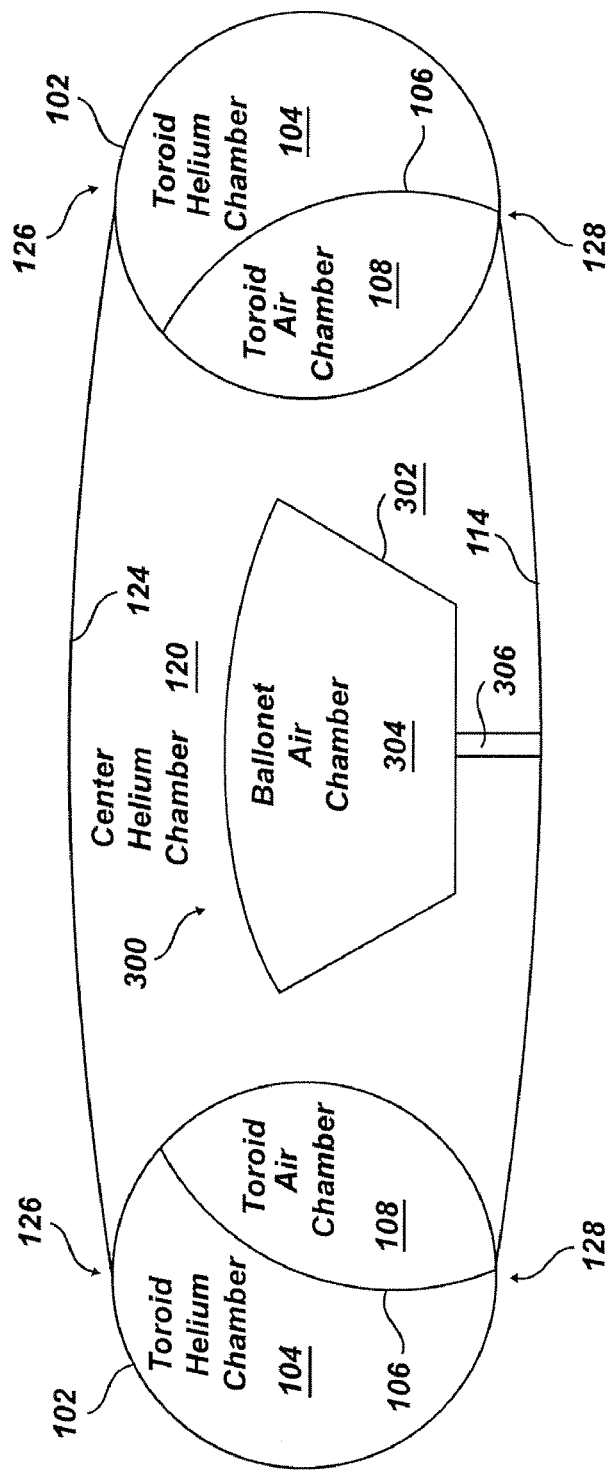
FIG. 4 illustrates a simplified view of the airship of FIG. 3 having top and bottom covers according to one embodiment of the invention.

FIG. 3 illustrates a front schematic view of the airship 100 of FIG. 1 that employs a BCS for controlling the static weight (and hence the ascent and descent) of the airship 100 according to one embodiment of the invention. FIG. 4 illustrates a simplified view of FIG. 3 according to one embodiment of the invention. Referring to FIGS. 3 and 4, the airship 100 can be configured in a number of different ways. For example, the central opening 120 can (1) be empty; (2) contain, but is not limited to, a lifting gas such as helium and a passive ballonet system; or (3) contain, but is not limited to, a lifting gas such as helium and a BCS system that operates on the same or similar principles as the outer tube 102 and the one or more chambers 106 described above.

When the central opening 120 is empty, the airship 100 may or may not include the bottom cover 114 and the top cover 124. Without the bottom and top covers 114 and 124, the airflow over the airship 100 may be disrupted, resulting in an unstable flight. The bottom and top covers 114 and 124 allow smooth airflow over the airship 100 (i.e., creating an aerodynamic airship 100) and allow a lifting gas to be contained within the central opening 120 to provide further lift to the airship 100. In this configuration, the airship 100 may include the blower 130 to maintain an internal pressure within the central opening 120 sufficient to give a convex shape to the bottom cover 114 and the top cover 124.

The central opening 120 may include a lifting gas and a passive ballonet system 300. That is, the central opening 120 may be filled with a lifting gas such as helium. The passive ballonet system 300 may include one or more compartments 302 capable of being filled with air 304. The passive ballonet system 300 compensates for the resultant changes in helium volume and maintains the convex shape of the bottom and top covers 114 and 124. Furthermore, with the passive ballonet system 300, the internal pressure within the central opening 120 is enough to maintain the convex shape but not enough to force an altitude change. Therefore, the attachments of the bottom and top covers 114 and the bottom and top covers 114 and 124 themselves do not have to withstand the same pressures differentials as the outer tube 102. Optionally, a conduit or line 306 may be used to channel the flow of air 304 into and out of the one or more compartments 302. The conduit 306 allows the air 304 to flow freely between the one or more compartments 302 and the outside atmosphere.

The central opening 120 may include a lifting gas and an active ballonet system 300. The active ballonet system 300 further includes pumps and/or valves 308 that actively control the flow of air into and out of the one or more compartments 302. The control device 116 may be used to actively control the operations of the pumps and valves 304 (i.e., the flow of air 304 into and out of the one or more compartments 302). When the airship 100 is on the ground, the one or more compartments 302 contain air 304 to increase the static weight of the airship 100. As the airship 100 ascends, air 304 freely escapes from the one or more compartments 302 and as the airship 100 descends, air 304 freely moves into the one or more compartments 302. Hence, the one or more compartments 302 act as a active ballonet such that the one or more compartments 302 inflate and deflate in response to altitude changes in the airship 100 caused by the operation of the BCS contained within the outer tube 102. In the active ballonet system 300, the one or more compartments 302 are filled with air 304 to increase the static weight of the airship 100. Using the pumps and/or valves 308, the air 304 is released from the one or more compartments 302 to cause the airship 100 to ascend and the air 304 is pumped into the one or more compartments 302 to cause the airship 100 to descend. Hence, the one or more compartments 302 and the pumps and/or valves 308 act as an active ballonet such that the one or more compartments 302 are inflated and deflated in a manner similar to the outer tube 102 and the one or more compartments 106. With the active ballonet system 300, the internal pressure within the central opening 120 is enough to force altitude changes. Therefore, the bottom and top covers 114 and 124 should be able to withstand the same pressures differentials as the outer tube 102.

During ascent of the airship 100, the one or more compartments 106 may be completely filled with the lifting gas and the one or more compartments 106 may be gradually emptied of air. In this configuration, the airship 100 is statically light and does not require the use of dynamic lifting forces or vectored engine thrust to remain airborne. To cause the airship 100 to ascend, the pressurized air 108 from inside the one or more compartments 106 is simply released (using one or more pumps and/or valves 110) into the atmosphere, subtracting mass (i.e., air) from the airship 100 and lowering the density of the lifting gas 104 as it is decompressed and allowed to expand. The lifting gas 104 is under pressure and thus pushes on the one or more compartments 106, forcing the air 108 out of the valves 110, as shown in FIG. 3. The release of the air 108 from the one or more compartments 106 can also be facilitated by the pumps 110 if required. The airship 100 thus becomes statically lighter in an amount substantially equal to the mass of air 108 released into the atmosphere and displaced by decompressing the lifting gas 104, resulting in increased buoyancy or "lift." In this mode of operation, the lifting gas 104 within the outer tube 102 is decompressed due to the removal of the air 108 from the compartment 106 and the overall internal pressure exerted on the outer tube 102 is decreased.

The rate at which the one or more compartments 106 decreases in volume and releases air 108 into the outside atmosphere can be accurately regulated by operation of the pumps and/or valves 110, which in turn controls the rate of ascent of the airship 100 and the altitude to which it ascends and achieves equilibrium. The ratio of the volume of lifting gas 104 in the outer tube 102 and the volume of air 108 in the compartment 106 can be altered rapidly and accurately enough to provide a pilot with ample control for all flight maneuvers including take off and landing, in-flight altitude changes, and the loading and unloading of passengers and cargo.

During descent of the airship 100, the outer tube 102 may be partially filled with the lifting gas 104 and the one or more compartments 106 may be partially or completely filled with air 108. In this configuration, the airship 100 is statically heavy but does not require the use of dynamic lifting forces or vectored engine thrust to remain airborne. To cause the airship 100 to descend, air from the outside atmosphere is pumped (using the pumps 110) into the one or more compartments 106, thereby adding mass to the airship 100 and increasing the density of the lifting gas 104 as it is compressed. As the outside air is pumped into the compartment 106, the compartment 106 expands and displaces a substantially equal amount of the lifting gas 104. Accordingly, the lifting gas 104 within the outer tube 102 is compressed and the overall internal pressure exerted on the outer tube 102 is increased. In this configuration, the airship 100 becomes statically heavier due to the increased mass of the air 108 within the one or more compartments 106.

The amount or distance the airship 100 descends can be controlled by pumping or introducing varying amounts of air 108 into the one or more compartments 106. The larger the volume of air 108 inside the one or more compartments 106, the greater the static weight of the airship 100. The airship 100 descends until it once again reaches equilibrium in the denser air at lower altitudes. Once equilibrium is reached, the airship 100 stops descending. If air 108 continues to be pumped into the one or more compartments 106, the airship 100 becomes heavy enough to descend to the ground. The BCS also has the ability to compensate for operational and/or atmospheric conditions when the airship 100 is flying or is grounded. For example, the pilot or the control device 116 may operate pumps and/or valves 110 to compensate for changes in temperature, altitude, atmospheric pressure, fuel burn, cargo off-loading and/or superheat. In one embodiment, the superheat may be absorbed as pressure, which will not affect the static weight or the altitude of the airship 100. The size of the one or more compartments 106 and the operator's ability to displace the lifting gas 104 with air 108 is limited by the maximum pressure differential that can be borne by the outer tube 102.

FIG. 5 illustrates a cross-sectional top view of an airship according to one embodiment of the invention. In an exemplary embodiment, the airship 500 includes four (4) compartments 106 that are filled with air 108 and four (4) pumps or valves 110 that are used to control the flow of air 108 into and out of the compartments 106. The outer tube 102 contains a lifting gas 104 that surrounds the compartments 106. The airship 500 may also include the central opening 120 for holding a lifting gas and the compartment 302 for holding air 304.

Figure 6:
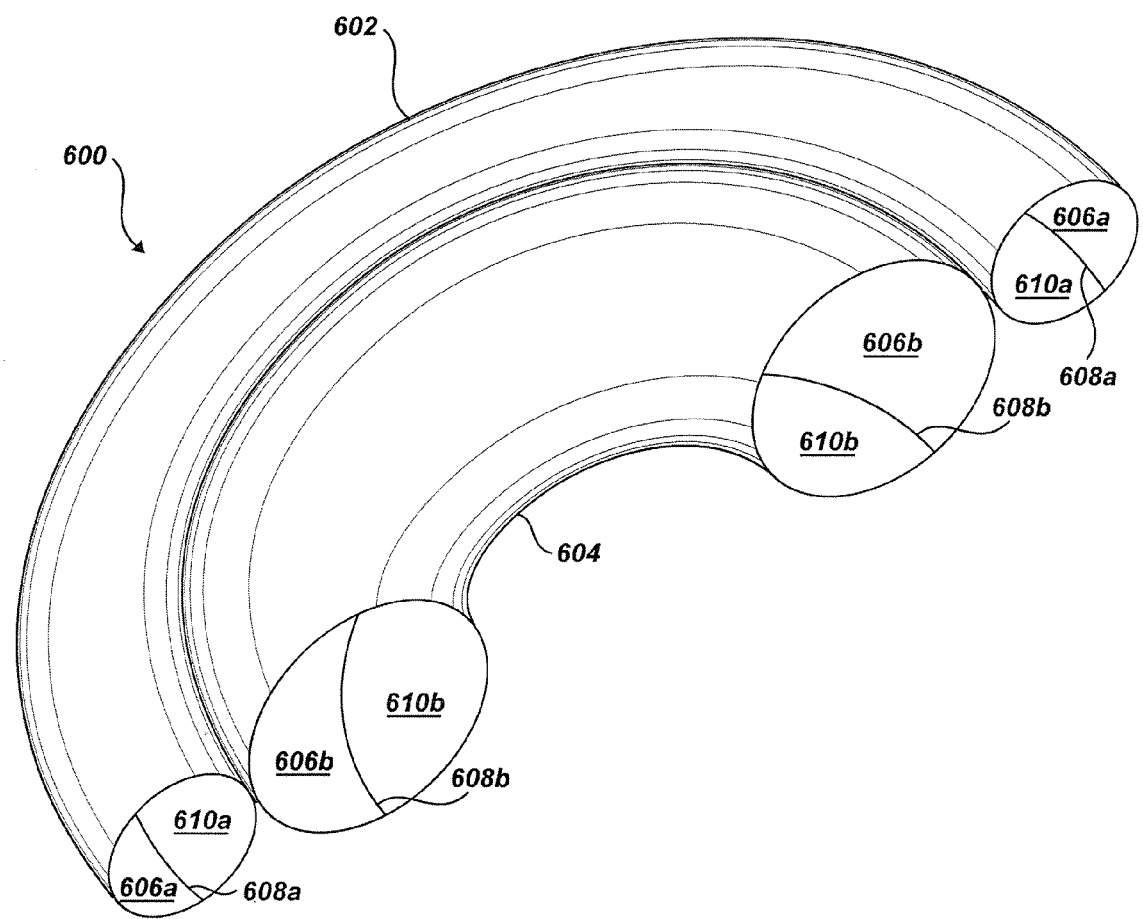
FIG. 6 illustrates a partial perspective view of an airship without top and bottom covers that employs a buoyancy control system according to one embodiment of the invention.
Figure 7:
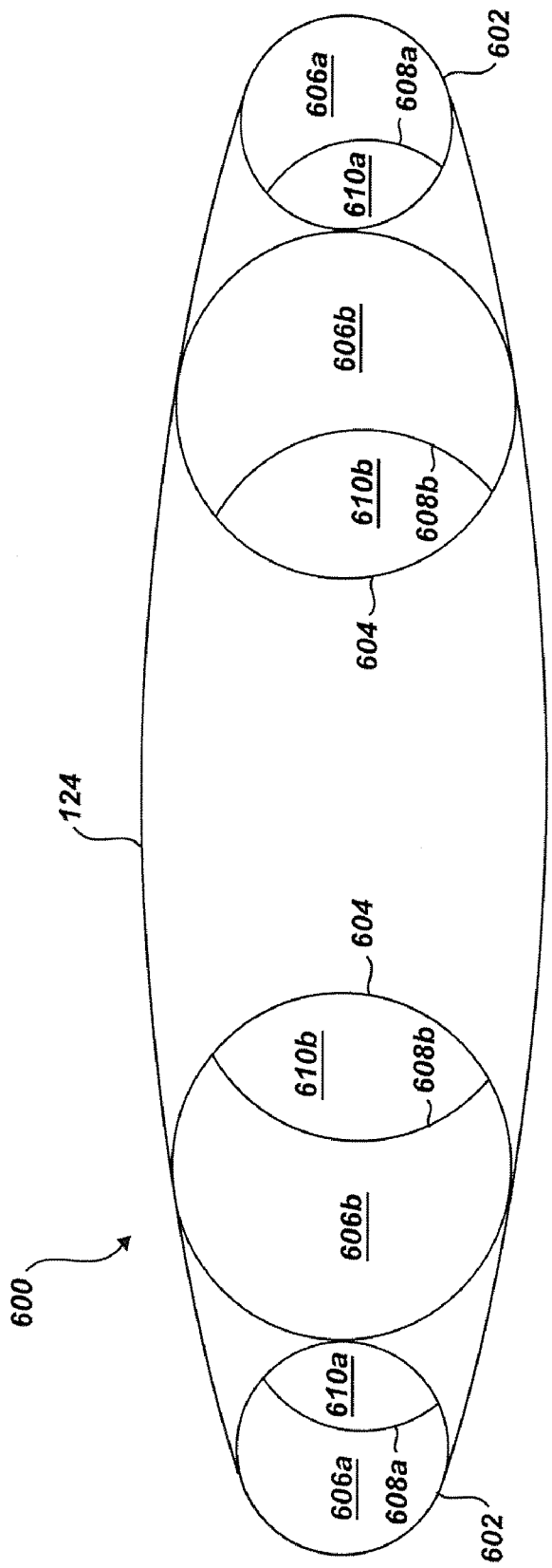
FIG. 7 illustrates a front cross-sectional view of the airship of FIG. 6 having top and bottom covers according to one embodiment of the invention.

FIG. 6 illustrates a partial perspective view of an airship 600 that employs a buoyancy control system ("BCS") according to one embodiment of the invention. FIG. 7 illustrates a front cross-sectional view of the airship 600 of FIG. 6 according to one embodiment of the invention. Referring to FIGS. 6 and 7, the airship 600 may include an outer tube 602 and an inner tube 604. The outer and inner tubes 602 and 604 may be incorporated into the airships 100 and 500 as shown in FIGS. 1 and 5. The outer and inner tubes 602 and 604 may be made of a gas-impermeable, flexible, inelastic (e.g., fabric) material and/or a gas-impermeable, semi-rigid, inelastic (e.g., lightweight metal or composite) material, or any combination thereof, that provides structural integrity to the airship 600. Sufficiently pressurized, the outer and inner tubes 602 and 604 provide rigidity to the airship 600 without requiring a separate rigid internal framework. In one embodiment, the outer and inner tubes 602 and 604 may be made of a Vectran® or Mylar®-based fabric material. In one embodiment, the outer and inner tubes 602 and 604 may be made of a composite material such as a combination of Vectran® and Mylar® where a Vectran® sheet is placed between two Mylar® sheets. The outer and inner tubes 602 and 604 may be configured in the shape of a cylinder, a toroid, and various other aerodynamic shapes. The inner tube 604 has a smaller diameter than the outer tube 602.

The outer and inner tubes 602 and 604 may be designed to contain one or more gases 606a and 606b (e.g., helium, hydrogen, air, other gases, and/or combinations thereof) and/or to enclose one or more compartments 608a and 608b that may contain one or more gases 610a and 610b, respectively. The gases 606a and 606b may provide all or most of the lift so that little or no additional energy is expended to make the airship 600 airborne. In one embodiment, the gases 606a and 606b within the outer and inner tubes 602 and 604 and the gases 610a and 610b within the compartments 608a and 608b may be pressurized to a pressure greater than the atmospheric pressure.

One or more compartments 608a and 608b may be positioned within the outer and inner tubes 602 and 604, respectively. For example, one compartment 608a and 608b may be positioned completely around and within each tube 602 and 604. Hence, the outer tube 602 may have one compartment 608a and the inner tube 604 may have one compartment 608b. In various embodiments, two, three, four, six, eight, ten, twelve or more compartments 608 may be positioned within each tube 602 and 604. The compartments 608 may be positioned an equidistant around each tube 602 and 604. The areas outside the one or more compartments 608 but within the outer and inner tubes 602 and 604 may contain a lifting gas 606a and 606b. Hence, the outer and inner tubes 602 and 604 may be made of a gas-impermeable material. Each compartment 608a and 608b may be made of a gas-impermeable, flexible, inelastic (e.g., fabric) material and may contain one or more gases 610a and 610b. In one embodiment, the one or more compartments 608a and 608b may be made of a polyurethane material. The one or more compartments 608a and 608b may be connected or fastened to the outer and inner tubes 602 and 604 using an adhesive such as glue, one or more tie-downs or attachment points, or a combination thereof. The size and shape of each compartment 608a and 608b may vary depending on the size, shape and weight of the airship 600.

In some embodiments, the airship 600 may include a first compartment 608a that extend around a portion of the outer tube 602 or the entire outer tube 602 and that is capable of holding air 610a. The area exterior to and around the compartment 608a but within the outer tube 602 contains helium 606a. When filled with air 610a, the compartment 608a may extend to partially or completely fill the outer tube 602.

In some embodiments, the airship 600 may include a second compartment 608b that extend around a portion of the inner tube 604 or the entire inner tube 604 and that is capable of holding air 610b. The area exterior to and around the compartment 608b but within the inner tube 604 contains helium 606b. When filled with air 610b, the compartment 608b may extend to partially or completely fill the inner tube 604.

If the operator desires the airship 600 to descend or remain grounded, one or more compartments 608a and 608b are filled with air 610a and 610b to increase the static weight of the airship 600. Conversely, if the operator desires the airship 600 to ascend, air 610a and 610b is released from the one or more compartments 608a and 608b. The airship 600 may include pumps and/or valves 110 (see FIG. 1) that may be attached to the one or more compartments 608a and 608b and that actively control the flow of air 610a and 610b into and out of the one or more compartments 608a and 608b.

In one embodiment, the lifting gas 606a and 606b may be contained in the outer and inner tubes 602 and 604 and the air 610a and 610b may be contained in the one or more compartments 608a and 608b. When the airship 600 is on the ground, the one or more compartments 608a and 608b may be completely or partially filled with air 610a and 610b, respectively. As the amount of air 610a and 610b in the one or more compartments 608a and 608b increases, the internal pressure within the outer and inner tubes 602 and 604 also increases. As the amount of air 610a and 610b in the one or more compartments 608a and 608b decreases, the internal pressure within the outer and inner tubes 602 and 604 also decreases. However, the outer and inner tubes 602 and 604 maintain an internal pressure greater than atmospheric pressure even when there is no air 610a and 610b in any of the compartments 608a and 608b, such that the outer and inner tubes 602 and 604 maintain their rigidity and continue to provide adequate structural support for engine pylons 118 (see FIG. 1) and the airship 600 as a whole. The engine pylons 118 (see FIG. 1) can be attached to an outer surface of the outer tube 602.

Figure 8:
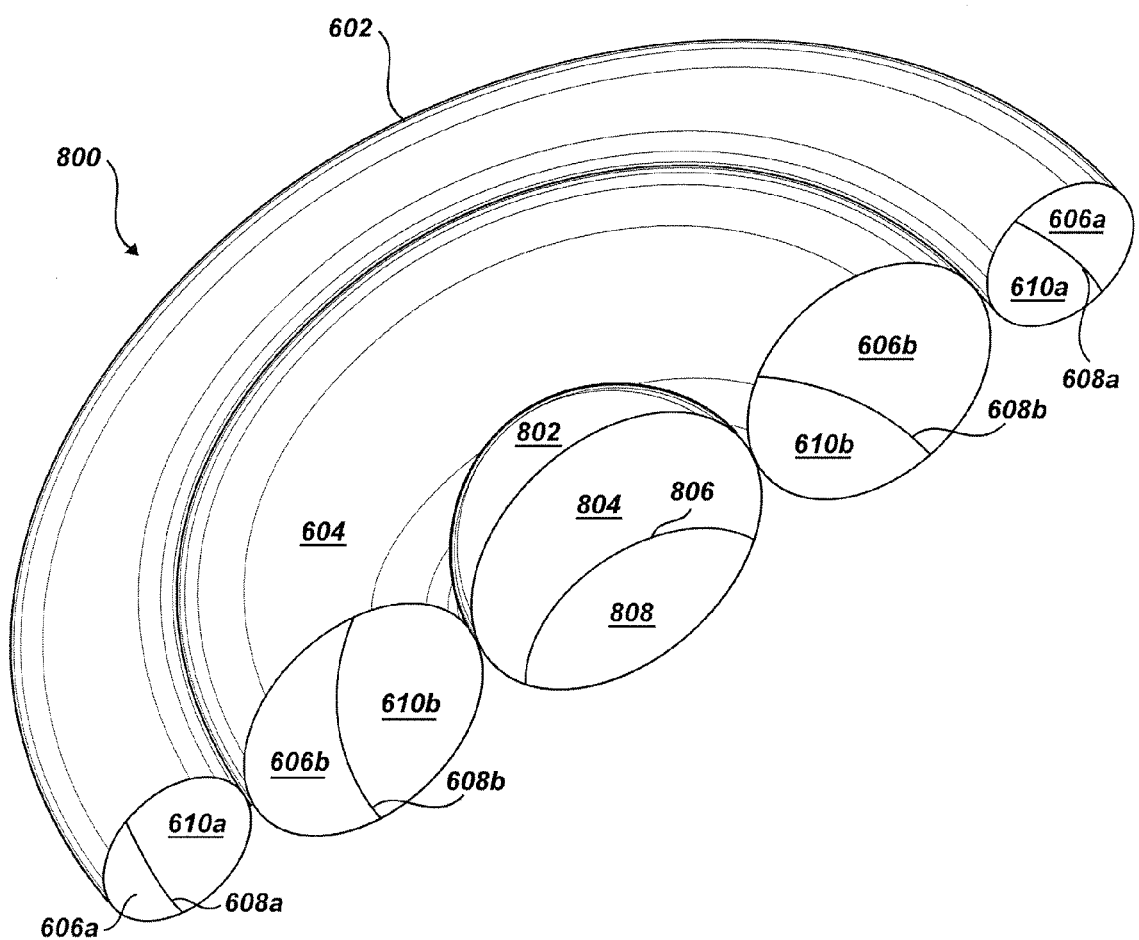
FIG. 8 illustrates a partial perspective view of an airship without top and bottom covers that employs a buoyancy control system according to one embodiment of the invention.
Figure 9:
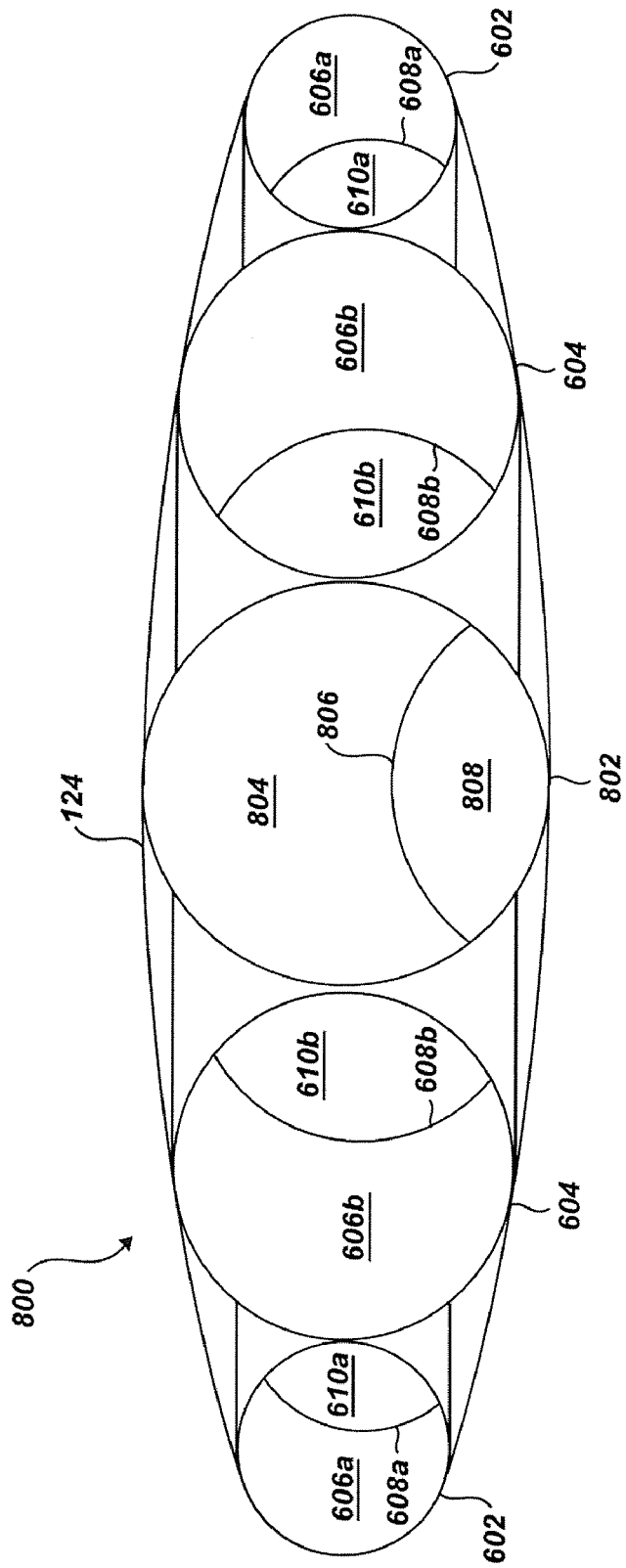
FIG. 9 illustrates a front cross-sectional view of the airship of FIG. 8 having top and bottom covers according to one embodiment of the invention.

FIG. 8 illustrates a partial perspective view of an airship 800 that employs a BCS according to one embodiment of the invention. FIG. 9 illustrates a front cross-sectional view of the airship 800 of FIG. 8 according to one embodiment of the invention. The airship 800 is similar to the airship 600. The airship 800 additionally includes a center ball 802. The center ball 802 may be filled with helium 804. One or more compartments 806 may be positioned within the center ball 802 and may be filled with air 808. The air 808 may be introduced into and removed from the one or more compartments 806 to cause the airship 800 to descend and ascend, respectively. In one embodiment, the airship 800 may include pumps and/or valves 110 (see FIG. 1) that may be attached to the one or more compartments 806 and that actively control the flow of air 808 into and out of the one or more compartments 806.

Figure 10:
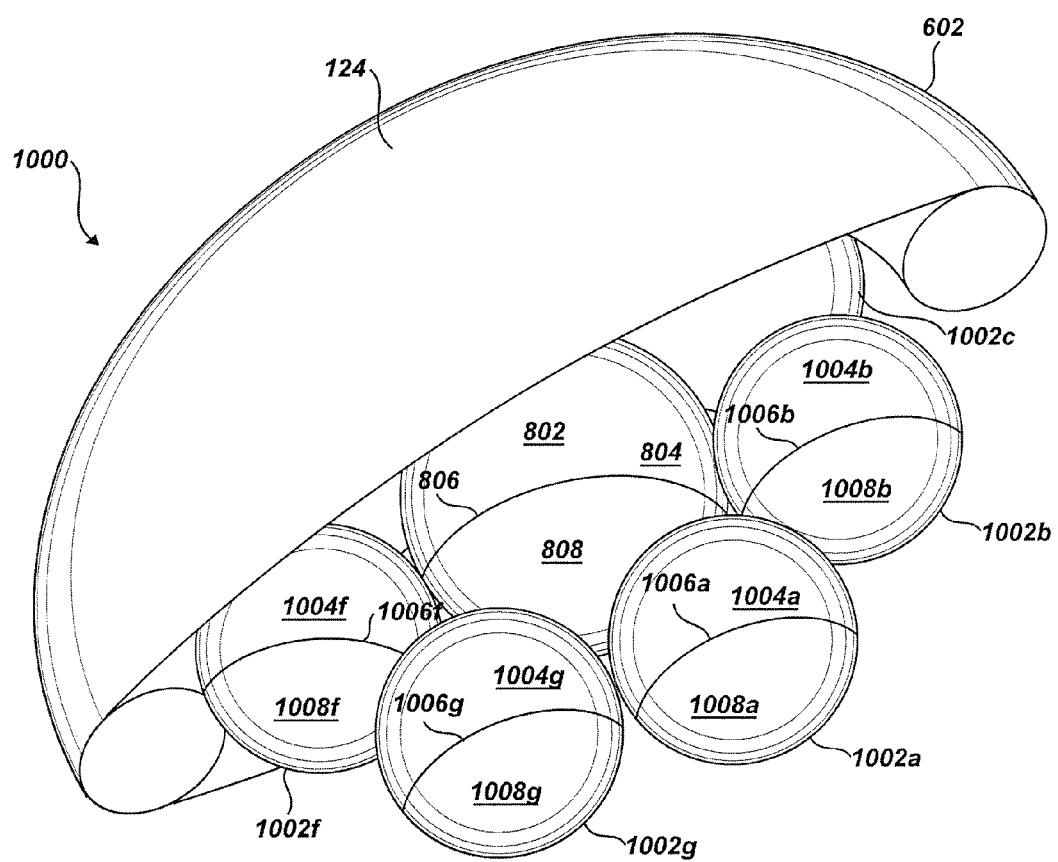
FIG. 10 illustrates a partial perspective view of an airship having a partial top cover that employs a BCS according to one embodiment of the invention.
Figure 11:
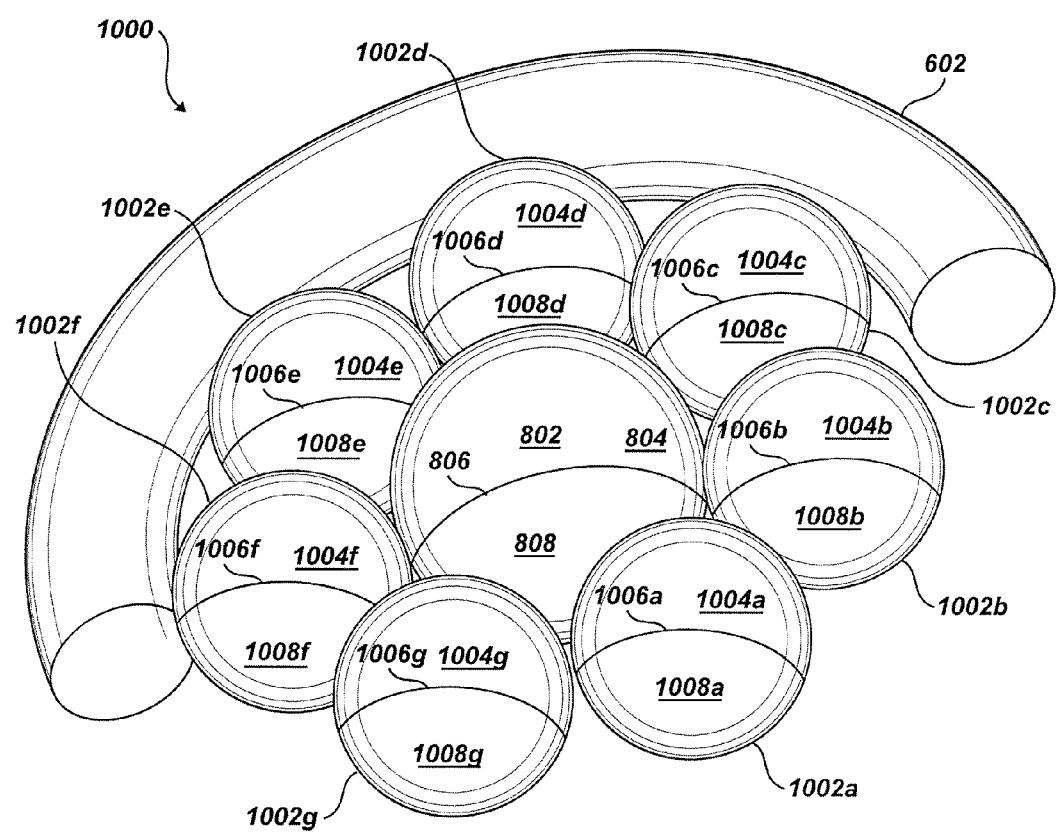
FIG. 11 illustrates a partial perspective view of the airship of FIG. 10 where the top and bottom covers has been removed to show the components of the airship according to one embodiment of the invention.

FIG. 10 illustrates a partial perspective view of an airship 1000 that employs a BCS according to one embodiment of the invention. FIG. 11 illustrates a partial perspective view of the airship 1000 of FIG. 10 where the top cover 124 has been removed to show the components of the airship 1000 according to one embodiment of the invention. The airship 1000 is similar to the airship 800. The inner tube 604 may be replaced with a plurality of balls or spheres 1002a-1002g. In various embodiments, the airship 1000 may have anywhere between 6 and 20 balls 1002 depending on the size of the airship 1000. The top and bottom covers 124 and 114 may be used to hold the balls 1002 in position. The plurality of balls 1002 may form a circle around the center ball 802 and may be positioned between the center ball 802 and the outer tube 602. The center ball 802 and the plurality of balls 1002 may be filled with helium 804 and 1004. One or more compartments 806 and 1006 may be positioned within the center ball 802 and the plurality of balls 1002 and may be filled with air 808 and 1008. The air 808 and 1008 may be introduced into and removed from the one or more compartments 806 and 1006 to cause the airship 1000 to descend and ascend, respectively. In one embodiment, the airship 1000 may include pumps and/or valves 110 (see FIG. 1) that may be attached to the one or more compartments 806 and 1006 and that actively control the flow of air 808 and 1008 into and out of the one or more compartments 806 and 1006.

Figure 12:
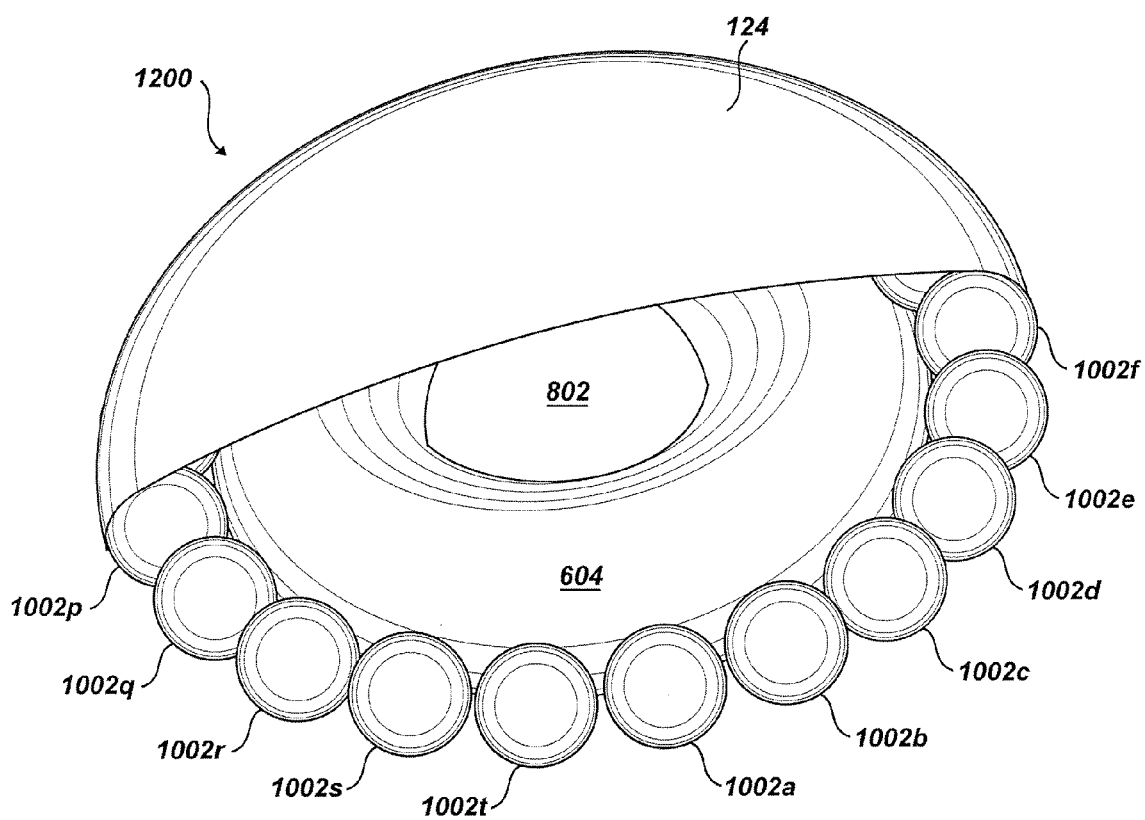
FIG. 12 illustrates a partial perspective view of an airship having a partial top cover that employs a BCS according to one embodiment of the invention.
Figure 13:
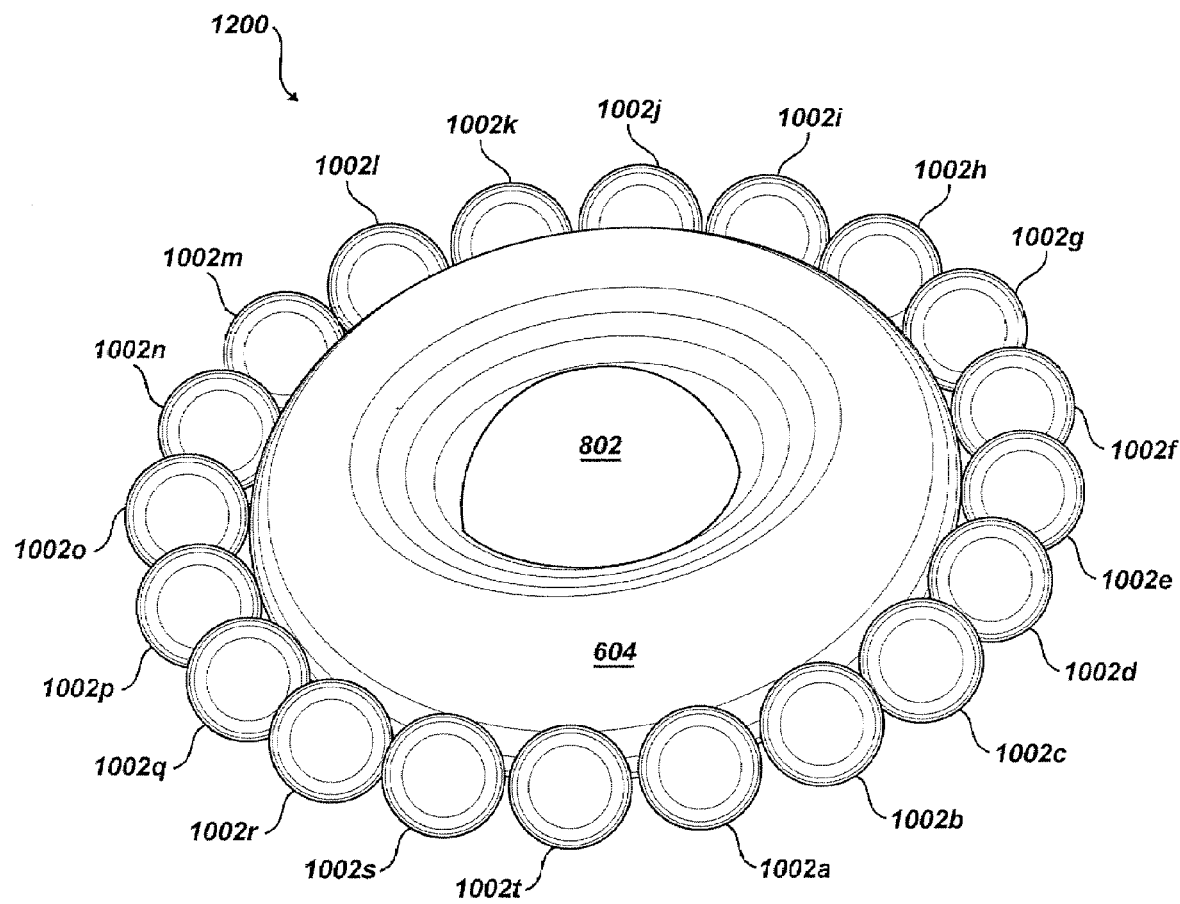
FIG. 13 illustrates a partial perspective view of the airship of FIG. 12 where the top and bottom covers have been removed to show the components of the airship according to one embodiment of the invention.

FIG. 12 illustrates a partial perspective view of an airship 1200 that employs a BCS according to one embodiment of the invention. FIG. 13 illustrates a partial perspective view of the airship 1200 of FIG. 12 where the top cover 124 has been removed to show the components of the airship 1200 according to one embodiment of the invention. The airship 1200 is similar to the airship 800. The outer tube 602 may be replaced with a plurality of balls or spheres 1002a-1002t. In various embodiments, the airship 1200 may have anywhere between 6 and 20 balls 1002 depending on the size of the airship 1200. The top and bottom covers 124 and 114 may be used to hold the balls 1002 in position. The plurality of balls 1002 may form a circle around the inner tube 604. The center ball 802 and the plurality of balls 1002 may be filled with helium 804 and 1004. One or more compartments 806 and 1006 may be positioned within the center ball 802 and the plurality of balls 1002 and may be filled with air 808 and 1008. The air 808 and 1008 may be introduced into and removed from the one or more compartments 806 and 1006 to cause the airship 1200 to descend and ascend, respectively. In one embodiment, the airship 1200 may include pumps and/or valves 110 (see FIG. 1) that may be attached to the one or more compartments 806 and 1006 and that actively control the flow of air 808 and 1008 into and out of the one or more compartments 806 and 1006.

Figure 14:
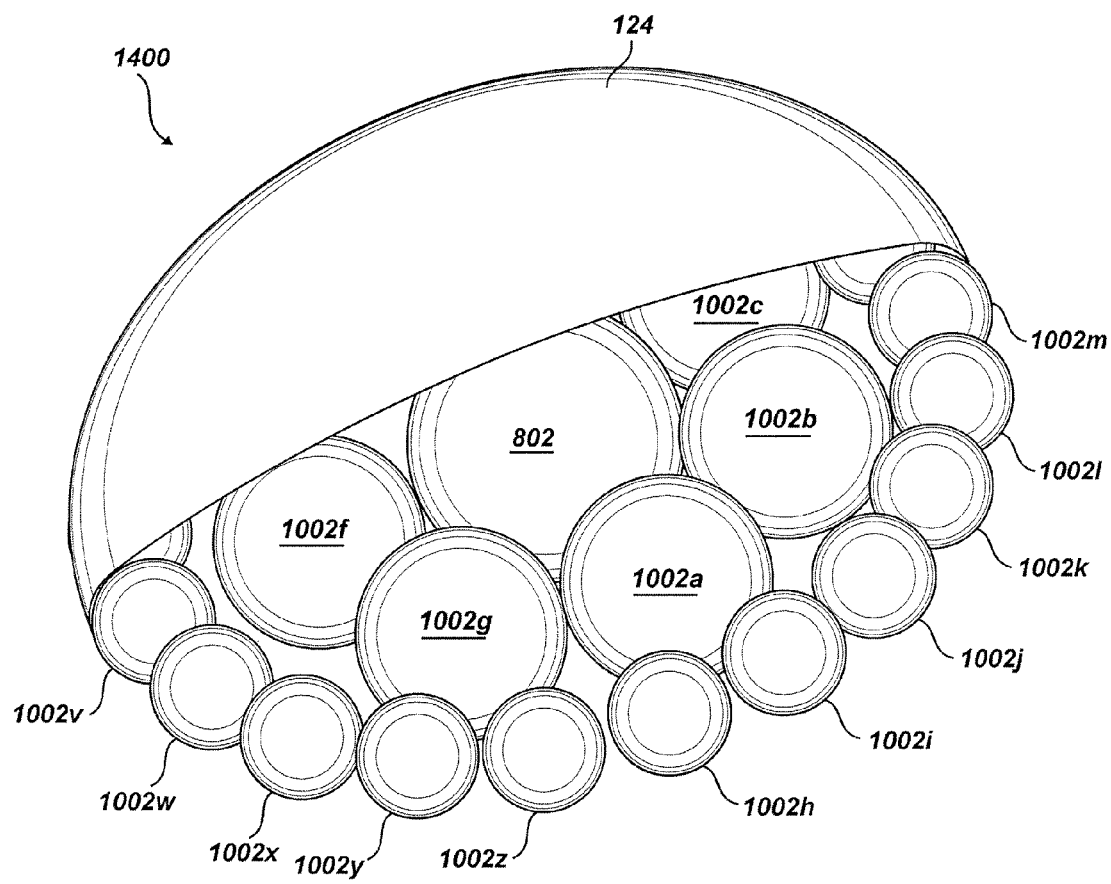
FIG. 14 illustrates a partial perspective view of an airship having a partial top cover that employs a BCS according to one embodiment of the invention.
Figure 15:
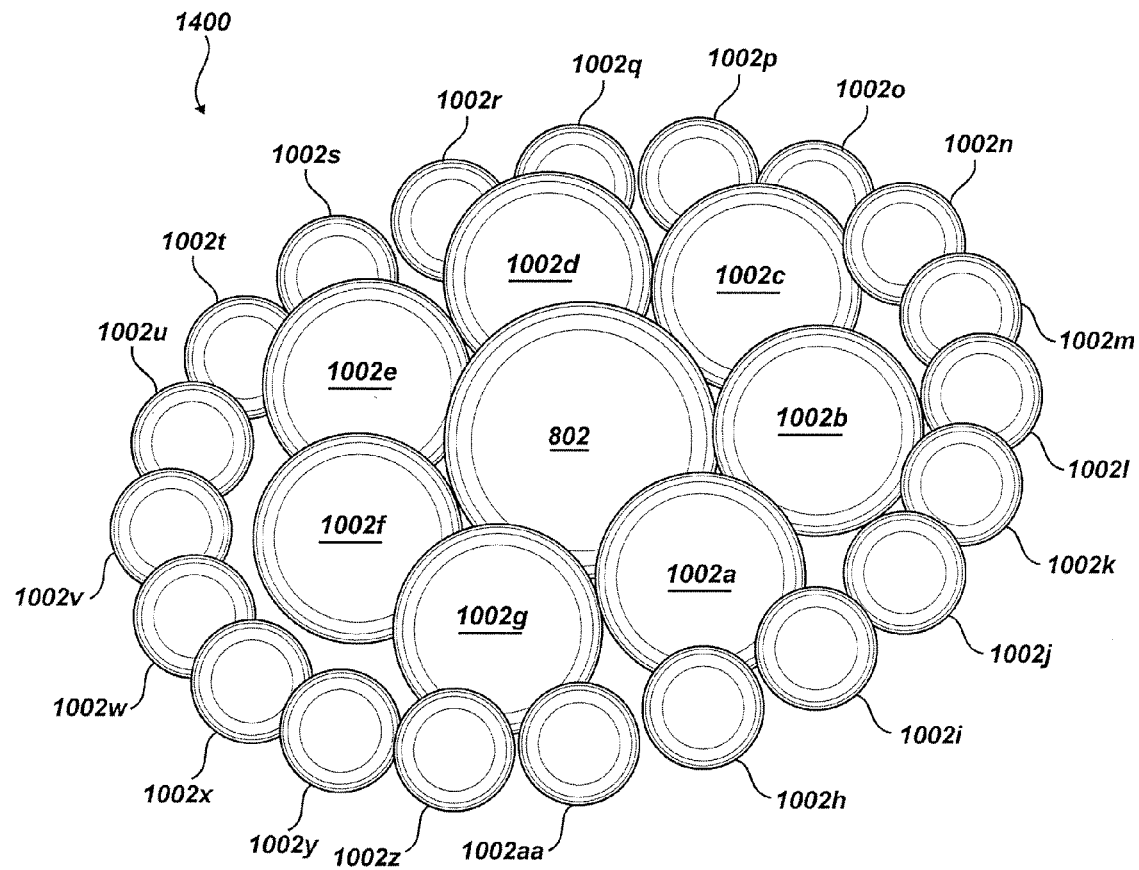
FIG. 15 illustrates a partial perspective view of the airship of FIG. 14 where the top and bottom covers have been removed to show the components of the airship according to one embodiment of the invention.

FIG. 14 illustrates a partial perspective view of an airship 1400 that employs a BCS according to one embodiment of the invention. FIG. 15 illustrates a partial perspective view of the airship 1500 of FIG. 14 where the top cover 124 has been removed to show the components of the airship 1400 according to one embodiment of the invention. The airship 1400 is similar to the airships 1000 and 1200. The outer and inner tubes 602 and 604 may be replaced with a plurality of balls or spheres 1002. In various embodiments, the airship 1400 may have anywhere between 6 and 30 balls 1002 depending on the size of the airship 1400. The top and bottom covers 124 and 114 may be used to hold the balls 1002 in position. The plurality of balls 1002 may form a circle around the center ball 802. The center ball 802 and the plurality of balls 1002 may be filled with helium 804 and 1004. One or more compartments 806 and 1006 may be positioned within the center ball 802 and the plurality of balls 1002 and may be filled with air 808 and 1008. The air 808 and 1008 may be introduced into and removed from the one or more compartments 806 and 1006 to cause the airship 1400 to descend and ascend, respectively. In one embodiment, the airship 1400 may include pumps and/or valves 110 (see FIG. 1) that may be attached to the one or more compartments 806 and 1006 and that actively control the flow of air 808 and 1008 into and out of the one or more compartments 806 and 1006.

While various airships have been described, the inventions disclosed herein may be implemented in various types of applications (e.g., blimps, airships, "hybrid" aircraft, underwater craft, submarines, etc.) and mediums where buoyancy control is desired. Note that the size and dimensions of the outer tube, and compartment(s) may vary depending on the maximum altitude desired, the materials available, and the vertical control response desired.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. An airship comprising:
   an outer tube formed in the shape of a toroid and defining a central space;
   a first compartment positioned within the outer tube and containing a first gas;
   a second compartment positioned within the outer tube and containing a second different gas;
   top and bottom covers further defining and enclosing the central space, the central space containing the second gas; and
   a controller that controls the flow of the first gas into and out of the first compartment to actively control the ascent and descent of the airship.

2. The airship of claim 1 wherein the outer tube is made of a flexible membrane material.

3. The airship of claim 1 wherein the first compartment and the second compartment are made of a gas-impermeable flexible material.

4. The airship of claim 1 wherein the first compartment is a bag made of a gas-impermeable, flexible, inelastic material.

5. The airship of claim 1 wherein the second compartment is a bag made of a gas-impermeable, flexible, inelastic material.

6. The airship of claim 1 wherein the first gas is air and the second gas is helium.

7. The airship of claim 1 wherein the top cover is circumferentially coupled to a top portion of the outer tube and the bottom cover is circumferentially coupled to a bottom portion of the outer tube.

8. The airship of claim 7 wherein the top cover is circumferentially coupled to the top portion using an adhesive and the bottom cover is circumferentially coupled to the bottom portion using an adhesive.

9. The airship of claim 1 wherein the top and bottom covers are made of a rigid composite material or a gas-impermeable, flexible, inelastic material.

10. The airship of claim 1 further comprising a third compartment positioned within the central space and containing the first gas.

11. The airship of claim 1 further comprising a fourth compartment positioned within the central space and containing the second gas.

12. The airship of claim 1 wherein the airship has a lenticular shape and does not have any internal structural support members to maintain the lenticular shape.

13. The airship of claim 1 further comprising a blower configured to maintain the shape of the top and bottom covers.

14. An airship comprising:
   an outer tube formed in the shape of a toroid and containing a first gas within a first compartment that is pressurized to a pressure greater than atmospheric pressure, the outer tube defining a central space;
   a second compartment positioned within the outer tube and containing a second different gas;
   top and bottom covers attached to the outer tube and further defining and enclosing the central space, the central space containing the first gas;
   a third compartment positioned within the central space and containing the second gas; and
   a control device that controls the flow of the second gas into and out of the second compartment or third compartment to actively control the ascent and descent of the airship.

15. The airship of claim 14 wherein the outer tube is made of a flexible membrane material.

16. The airship of claim 14 wherein the second compartment and the third compartment are made of a gas-impermeable flexible material.

17. The airship of claim 14 wherein the second compartment is a bag made of a gas-impermeable, flexible, inelastic material.

18. The airship of claim 14 wherein the third compartment is a bag made of a gas-impermeable, flexible, inelastic material.

19. The airship of claim 14 wherein the first gas is helium and the second gas is air.

20. The airship of claim 14 wherein the top cover is circumferentially coupled to a top portion of the outer tube and the bottom cover is circumferentially coupled to a bottom portion of the outer tube.

21. The airship of claim 20 wherein the top cover is circumferentially coupled to the top portion using an adhesive and the bottom cover is circumferentially coupled to the bottom portion using an adhesive.

22. The airship of claim 14 wherein the top and bottom covers are made of a gas-impermeable, flexible, inelastic material.

23. The airship of claim 14 further comprising a first valve coupled to the second compartment to control the flow of the second gas into and out of the second compartment.

24. The airship of claim 14 further comprising a second valve coupled to the third compartment to control the flow of the second gas into and out of the third compartment.

25. The airship of claim 14 wherein the airship has a lenticular shape and does not have any internal structural support members to maintain the lenticular shape.

26. The airship of claim 14 further comprising a blower positioned within the central central space and configured to maintain the shape of the top and bottom covers.

27. The airship of claim 14 further comprising a plurality of propellers coupled to the outer tube to provide yaw control to the airship.

28. The airship of claim 14 further comprising a first catenary cable connected to the top cover and the outer tube and a second catenary cable connected to the bottom cover and the outer tube.

* * * * *